(12) United States Patent
Gieselmann et al.

(10) Patent No.: US 7,620,571 B2
(45) Date of Patent: Nov. 17, 2009

(54) METHOD AND COMPUTER PROGRAM PRODUCT FOR PERFORMING AN OFF-LINE PRODUCT AVAILABILITY CHECK AT A USER COMPUTER

(75) Inventors: Thomas Gieselmann, Hockenheim (DE); Stephan Dust, Mannheim (DE)

(73) Assignee: SAP AG, Walldorf (DE)

( * ) Notice: Subject to any disclaimer, the term of this patent is extended or adjusted under 35 U.S.C. 154(b) by 929 days.

(21) Appl. No.: 10/835,063

(22) Filed: Apr. 30, 2004

(65) Prior Publication Data

US 2005/0096998 A1 May 5, 2005

Related U.S. Application Data

(60) Provisional application No. 60/515,557, filed on Oct. 29, 2003.

(51) Int. Cl.
*G06Q 30/00* (2006.01)

(52) U.S. Cl. .................. 705/26; 705/1; 705/27

(58) Field of Classification Search .......... 705/26, 705/27

See application file for complete search history.

(56) References Cited

U.S. PATENT DOCUMENTS

| | | | |
|---|---|---|---|
| 5,765,143 A | 6/1998 | Sheldon et al. | |
| 5,878,401 A | 3/1999 | Joseph | |
| 6,141,658 A | 10/2000 | Merh et al. | |
| 6,253,187 B1 | 6/2001 | Fox | |
| 6,438,547 B1 | 8/2002 | Mehr et al. | |
| 6,550,674 B1 | 4/2003 | Neumark | |
| 6,561,417 B1 | 5/2003 | Gadd | |
| 6,567,824 B2 | 5/2003 | Fox | |
| 6,609,101 B1 | 8/2003 | Landvater | |
| 6,990,488 B1* | 1/2006 | Chenault | 707/7 |
| 2002/0072980 A1* | 6/2002 | Dutta | 705/26 |
| 2002/0095307 A1* | 7/2002 | Greamo et al. | 705/1 |
| 2002/0138679 A1 | 9/2002 | Koning et al. | |
| 2003/0028507 A1 | 2/2003 | Pauliks et al. | |
| 2003/0088472 A1* | 5/2003 | Offutt et al. | 705/22 |
| 2003/0115285 A1 | 6/2003 | Lee et al. | |
| 2003/0158796 A1* | 8/2003 | Balent | 705/28 |
| 2003/0163364 A1 | 8/2003 | Piercy et al. | |
| 2003/0212602 A1 | 11/2003 | Schaller | |

OTHER PUBLICATIONS

"Evergreen Internet Delivers Universal Pricing and Inventory Solution for Integrating Retail Point-of-Sales and ECommerce Solutions" Business Editors, High-Tech Writers iEC 2000. Business Wire. New York: Feb 29, 2000. Retrieved via ProQuest on Jun. 30, 2009.*

* cited by examiner

*Primary Examiner*—Jeffrey A. Smith
*Assistant Examiner*—Michael A. Misiaszek
(74) *Attorney, Agent, or Firm*—Fish & Richardson P.C.

(57) ABSTRACT

Techniques describe providing product availability information for use by offline computers. More particularly, a category of product availability for a product is determined at one computer system, often a central logistics or sales system, and transmitted to another computer, typically, though not necessarily, a mobile computer. The category of product availability is accessible at the mobile computer even when the computer is offline—that is, is not connected to the computer that determined the category of product availability.

20 Claims, 6 Drawing Sheets

US 7,620,571 B2

METHOD AND COMPUTER PROGRAM PRODUCT FOR PERFORMING AN OFF-LINE PRODUCT AVAILABILITY CHECK AT A USER COMPUTER

CROSS-REFERENCE TO RELATED APPLICATIONS

This application claims priority from U.S. Provisional Application No. 60/515,557, filed Oct. 29, 2003, titled "Offline Stock Check," which is hereby incorporated by reference in its entirety.

TECHNICAL FIELD

This invention relates to the management of sales information.

BACKGROUND

Computer systems often are used to manage and process business data. To do so, a business enterprise may use various application programs running on one or more computer systems. Application programs may be used to process business transactions, such as taking and fulfilling customer orders and providing supply chain and inventory management. Separate applications working independent of each other may be linked via asynchronous messages that are periodically exchanged.

An application program may provide information as to an inventory amount or in-stock amount of a good or product for sale. The in-stock amount may be updated using a variety of means, including receiving a transmission of amounts of goods received or used from a remote computer system. An in-stock check for a good may be performed that compares the current in-stock amount with a predetermined stock level and generates an indication that the good needs to be replaced when the current in-stock amount is less than the predetermined stock level.

SUMMARY

The invention provides product availability information for use by offline computers. More particularly, a category of product availability for a product is determined at one computer system, often a central logistics or sales system, and transmitted to another computer, typically (though not necessarily) a mobile computer. The category of product availability is accessible at the mobile computer even when the computer is offline—that is, is not connected to the computer that determined the category of product availability.

One challenge in providing product availability information for use by offline computers lies in minimizing the time required to update product availability information stored on the mobile computer when product availability information changes on the central logistics or sales system. This is because the mobile computer needs to connect to the central logistics or sales system to obtain updated product availability information for later offline use, product availability information often changes, and product availability information may be needed for large numbers of products. In one general aspect, an indication as to whether a product is available is provided. To do so, an identification of a particular product identified in a data collection stored on a first computer system is received. The particular product is associated with a data entry that identifies the particular product and the data entry is associated with one of multiple categories of product availability. The category of product availability that is associated with the data entry is provided when a second computer system is not accessible to the first computer system and a request as to whether the product is available is received.

Implementations may include one or more of the following features. For example, a second data collection on a second computer system may be accessed. The second data collection may include product information and threshold information. Each product information entry may be associated with an amount of product that is available and a category of product availability that is based on the amount of product that is available. The threshold information may include a threshold entry for each category of product availability, and each threshold entry may be associated with a product information entry. The threshold entries may be used to determine, based on an amount of a product that is available, a category of product availability for the product information entry that is associated with the product. The determined category of product availability may be associated with the product information entry and transmitted to the first computer system.

The determined category of product availability and the association of the determined category of product availability with the product information entry may be stored in the second data collection. The second data collection also may include product group information and, when so, each product group entry may be associated with (a) product information entries, and (b) threshold entries for determining a category of product availability for product information entries that are associated with the product group entry. The threshold entries may be used to determine a category of product availability for at least one product information entry that is associated with the particular product group.

A category of product availability may be determined based on an implicit threshold for the category of product availability derived from at least one threshold entry of the second data collection. A middleware messaging system may be used for routing messages that include categories of product availability between the first computer system and the second computer system.

Each product information entry in the data collection may be associated with a distribution channel, and, when so, each product information entry in the product information of the second data collection may be associated with an amount of product that is available in one of multiple distribution channels. The threshold information may include threshold entries for each of category of product availability where each threshold may be associated with a product information entry that includes a particular distribution channel. The threshold entries may be used to determine a category of product availability for a product information entry and an associated distribution channel. The determination may be based on an amount of product that is available in the distribution channel. The determined category of product availability and the distribution channel may be associated with the product information entry. The determined category of product availability for the product entry associated with the distribution channel may be transmitted to the first computer system.

Each product information entry in the data collection may be associated with a location, and, when so, each product information entry in the product information of the second data collection may be associated with an amount of product that is available in one of multiple locations. The threshold information may include threshold entries for each of category of product availability where each threshold is associated with a product information entry that includes a particular location. The threshold entries may be used to determine, based on an amount of product that is available in the location, a category of product availability for the product information entry. The determined category of product availability and the location may be associated with the product information entry. The determined category of product availability for the product entry associated with the location may be transmitted to the first computer system.

Implementations of the techniques discussed above may include a method or process, a system or apparatus, or computer software on a computer-accessible medium. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
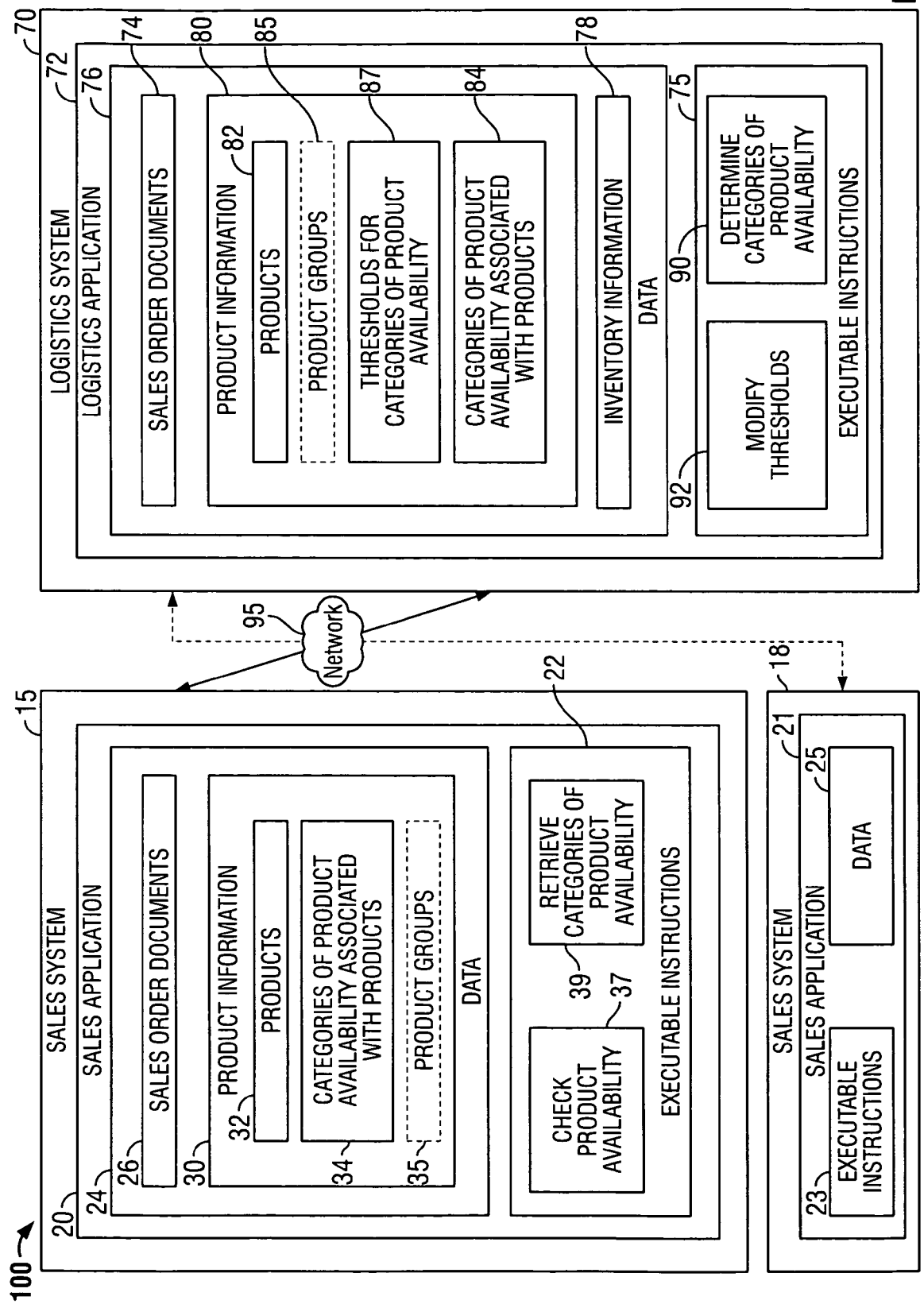
FIGS. 1 and 2 are block diagrams of an enterprise information technology system incorporating various aspects of the invention.

An enterprise information technology (IT) system 100, shown in FIG. 1, provides product availability information for use by offline computers in accordance with the invention. The system 100 includes sales systems 15 and 18 and a logistics system 70 that are transiently connected through network 95. In general, a categorization of the available amount of a product is determined at the logistics system 70 and transferred to the sales systems 15 and 18. The categorization of the available amount of a product on the sales system 15 or 18 can be checked even when the sales system 15 or 18 is not connected to the logistics system 70.

More particularly, the sales system 15 or 18 includes a sales application 20 or 21, respectively, in which sales order documents (or sales order objects) are created and revised. Each of the sales systems 15 or 18 may be, for example, a computer system having a sales application thereon with which a salesperson enters sales orders, often while the salesperson is at a customer site. In such a case, the sales system 15 or 18 may be a mobile computing system, such as a laptop computer or a personal digital assistant (PDA). Each of the sales systems 15 or 18 also may be, for example, a computer system with a call center application thereon with which a sales agent enters sales orders while talking to a customer on a telephone. Another example of a sales system 15 or 18 is an Internet shop to which a user may connect, for example via the Internet, and enter a sales order via a web interface. The user connecting to the Internet shop may be a salesperson or a customer. In one implementation, each of the sales systems 15 or 18 is a customer relationship management system.

As is conventional, each of the sales systems 15 or 18 is capable of executing the sales application 20 or 21 by executing executable instructions 22 or 23 of the sales application 20 or 21 on data 24 or 25, respectively. The values in data 24 or 25 on each of sales systems 15 or 18 may be the same or different. Particularly when a sales system 15 or 18 is a mobile sales system or a distributed sales system, the values in the data 24 or 25 may include only data that is relevant to the user or users of the sales system 15 or 18. For example, when the sales system 15 or 18 is used by a salesperson, data 24 or 25 includes only data that is relevant to salespersons responsibility and not data that is relevant to other salespersons who are not users of the sales system 15 or 18.

In one example, the sales system 15 may be a mobile sales system 15 that includes only data relevant to the user of the mobile sales system 15 and the sales system 18 may be a central sales system 18 that includes data for multiple mobile sales systems. The mobile sales system 15, using the network 95, periodically synchronizes data stored on the mobile sales system 15 with the data stored on the central sales system 18. The synchronization may be performed using middleware stored on the mobile sales system 15 and the central sales system 18. The middleware directs data exchange messages between the mobile sales system 15 and the central sales system 18 and uses different types of message structures to communicate different data structures. An example of middleware is described more fully in FIG. 2.

For purposes of brevity, sales system 15 only illustrates some of the components of executable instructions 22 and data 24 in the sales application 20. As would be understood by one skilled in the art, the sales system 18 also includes corresponding components of executable instructions 23 and data 25 in the sales application 21.

The data 24 includes the sales order documents 26 and product information 30. Product information 30 includes products 32 for which sales orders may be entered or revised using the sales application 20. The product information 30 also includes categories 34 of product availability associated with products. A category of product availability provides a general indication of the amount of each product that is available, such as the amount in inventory (or stock) and available for delivery to a customer (or amount expected to be available for delivery to a customer soon). A category of product availability may be a specifically defined division in a manner of classifying or categorizing amounts of a product available. In some implementations, a category of product availability may relate to an amount of a product available in a particular location or through a particular distribution channel. In one example, each of the categories 34 of product availability associated with a particular product may be one of several categories. By way of example, the several categories by which an available product amount may be classified may be non-critical, critical and very critical. The particular category of product availability associated with a product generally reflects whether difficulty is expected to occur in delivering the product to a customer. For example, sales order for a product having a category of product availability that is critical may be difficult to fulfill in a timely manner, and a sales order for a product having a category of product availability that is very critical may be unlikely to be delivered to a customer in a timely manner. Typically (though not necessarily), the same categories are used to describe the availability of different products; however, the in-stock amounts of each product may be categorized differently. One product may be categorized as "critical" based on an in-stock amount that is different than the in-stock amount used to categorize another product as "critical."

In some implementations, a product entry in products 32 optionally may be associated with a product group entry in product groups 35 that organizes multiple products into a group. In one example, products supplied by a particular manufacturer may be associated with a particular product group entry. In another example, the same type of product may be associated with a product group entry.

The executable instructions 22 of the sales application 20 include a check product availability process 37 for accessing the category of product availability for a product stored in categories 34. The check-product-availability process 37, based on the category of availability for the product, presents an indication whether there may be a problem in delivering the product to a customer in a timely manner. This may be accomplished, in one example, the category of product availability may be presented. In another example, a symbol associated with the category of product availability may be presented.

The executable instructions 22 of the sales application 20 also include a process 39 to retrieve categories of product availability for periodically updating the categories 34 of product availability associated with products, or a portion thereof, when the sales system 15 is connected through the network 95 to the logistics system 70 that creates or updates the categories of product availability for products.

The logistics system 70 includes a logistics application 72, in which sales order documents 74 are processed to fulfill and execute sales orders. Alternatively, the logistics application 72 may receive only the delivery information for a sales order document and may process that information to effect delivery. The logistics system 70 may be, for example, a application used by an order fulfillment center. In this example, the information from a sales order document may be used to effect the proper delivery of the product that has been sold. As is conventional, the logistics application 72 includes executable instructions 75 and data 76.

The data 76 of the logistics application 70 includes sales order documents 74 and inventory information 78 that includes an amount of each product that is in inventory and available for delivery to a customer. This may also be referred to as an in-stock product quantity.

The data 76 of the logistics application 70 also includes product information 80 that includes products 82, categories 84 of product availability associated with products, and, optionally, product groups 85, each of which has been described previously with respect to the sales application 20.

The product information 80 also includes thresholds 87 for categories of product availability. Each threshold entry in thresholds 87 is associated with a product and identifies, for the associated product, thresholds of in-stock product quantities for each category of product availability applicable to the product. (As indicated previously, typically, though not necessarily, the same categories and different thresholds are used for all products.) A threshold specifically defines the in-stock amounts of a product that are associated with a category. By way of example, when the categories of product availability include a non-critical category, a critical category, and a very critical category, each category is associated with a threshold that identifies a specifically defined division to be used to classify amounts of product available. In particular, there is a threshold of a range of in-stock product quantity for the non-critical category, another range of in-stock product quantity for the critical category, and yet another range of in-stock product quantity for the very critical category. Each of the ranges in the threshold entry are mutually-exclusive—that is, non-overlapping.

In some implementations, a threshold entry may be associated with a product group in lieu of being associated with a product. In such a case, the threshold entry indicates thresholds of in-stock product quantities for the products associated with the product group to which the threshold entry applies. Additionally, in some cases, one threshold entry may be associated with a product group and another threshold entry may be associated with a particular product that is associated with the same product group that is associated with the other threshold entry. In such a case, the threshold entry that is applicable to the particular product (rather than the threshold entry that is applicable to the product group) is used to categorize the in-stock product quantity of the particular product. The threshold entry that is applicable to the product group is used to categorize the in-stock product quantity of the other products associated with the product group. This may be useful when many but not all of the products within a product group have similar sales patterns.

The executable instructions 75 of the logistics application 72 include a process 90 to determine categories 84 of product availability for a particular product and store the determined categories in the categories 84 of product availability associated with products. To do so, the in-stock product quantity of a particular product in inventory information 78 is compared with the thresholds in the threshold entry of the thresholds 87 that applies to the particular product. The category is determined based on results of the comparison—typically, a match of the in-stock product quantity with one of the thresholds. The category is then stored in categories 84.

The executable instructions 75 of the logistics application 72 also include a process 92 to allow a user, such as a system administrator or business analyst, to modify the threshold entries in thresholds 87. For example, the user may create a new threshold entry for a product or a product group. The user also may modify a threshold entry, such as, by way of example, changing the thresholds of in-stock product quantities for each category of product availability.

Messages containing enterprise application data related to product sales and product availability are transferred, directly or indirectly, between each of the sales systems 15 or 18 and the logistics system 70 over the network 95 as is depicted in FIG. 1. The network 95 may be one of a variety of established networks, such as, for example, the Internet, a Public Switched Telephone Network (PSTN), the Worldwide Web (WWW), a wide-area network ("WAN"), a local area network ("LAN"), a wired network, or a wireless network.

A salesperson or another type of user, may use the sales application 20 on the sales system 15 to check product availability even when the sales system 15 is not connected through the network 95 to the logistics system 70. This may provide the salesperson a reasonable degree of certainty that a product can be delivered to the customer in a timely manner. By using a categorization of the in-stock quantity of a product, rather than an exact in-stock quantity, the amount of information that needs to be transferred from the logistics system 70 over the network 95 to the sales system 15 may be reduced. This in turn, may help to reduce the amount of time necessary to retrieve product availability information and also provide useful product availability information to the salesperson.

More particularly, exact-quantity inventory information may frequently fluctuate as sales orders are entered, sales orders are fulfilled, and products arrive from suppliers. Maintaining an accurate measure of exact-quantity product availability information on a sales system that has limited transmission capacity (such as a mobile sales system or a distributed sales system) may be difficult when large numbers of products or large amounts are sold. In contrast, providing a category of product availability for a particular product may decrease the need frequency of providing product availability information to a distributed or mobile sales system. A category may be less volatile and less likely to change than an exact quantity of product availability information. The use of categories of product availability, rather than an exact quantity of product availability, may be particularly useful when a sales system is a mobile computer system that has limited transmission capability or a sales system requires human initiation and/or monitoring of the retrieval process 39. The transmission time for the process 39 to retrieve categories of product availability from the logistics system 70 may be further minimized when only categories of product availability that have changed from categories of product availability that are already stored in categories 34 are retrieved.

A categorization of product availability may be more useful than an exact in-stock quantity of a product. This may be particularly true when a business analyst establishes thresholds for products based on patterns of sales of particular products that an individual salesperson would not be aware. In such a case, a categorization may alert a salesperson that a problem may occur in fulfilling a sales order when an exact in-stock quantity would not. This may be especially true when large amounts of a product may be rapidly sold so that a large amount of in-stock product may be deceptive as to the difficulty of delivering the product to the customer in a timely manner.

In one example of how the sales system 15 may be used, prior to attending a sales meeting with a customer or when preparing an order quotation for a customer, a salesperson may use process 37 to check the product availability of the products that the salesperson expects to sell or that the customer is likely to be interested in purchasing. This may enable the salesperson to plan an appropriate sales strategy based on the categorization of product availability. In another example, when a sales order is entered to the sales application 20 and/or when sales order documents 26 are transmitted to the logistics system 70, the process 37 may be used to check product availability of products in the sales orders. In some instances, the software application 20 may programmatically initiate without human intervention the process 37 to check product availability as part of another process, such as a data transfer process or a sales order entry process. Additionally or alternatively, a salesperson may directly initiate the process 37 to check product availability for one or more products, such as by entering a command, making a selection from a menu of processes, or using a pointing device to press a button on a graphical user interface. In some implementations, particular categories of product availability (such as categories indicating a low in-stock quantity that may indicate a potential problem with a timely delivery) may not prevent a salesperson from placing an order, whereas in other implementations such categories may prevent the placement of a sales order.

In some implementations, a user may be able to configure the manner in which the sales application 20 checks for product availability. In one example, a user may determine (that is configure) whether the sales application 20 uses the process 37 to check for product availability each time an order is entered to the sales application 20, whether the sales application 20 uses the process 37 to check for product availability when sales orders are transmitted to the logistics system 70, or both. A salesperson may find useful the ability to disable the process 37 to check product availability when making a sale. This may be particularly true when in-stock quantity for a product included in the sales order is categorized in such a way to indicate that there may be a problem with a timely delivery and the salesperson is placing the sales order in the presence of the customer. The salesperson, by disabling the process 37, may be able to prevent unnecessarily raising customer concern regarding delivery of the sales order.

In some implementations, a user may only be permitted to check for product availability or otherwise access product information for products for which the user is responsible. One way to do so is through the use of a middleware message system that provides access control for users based on responsibilities associated with the user.

Figure 2:
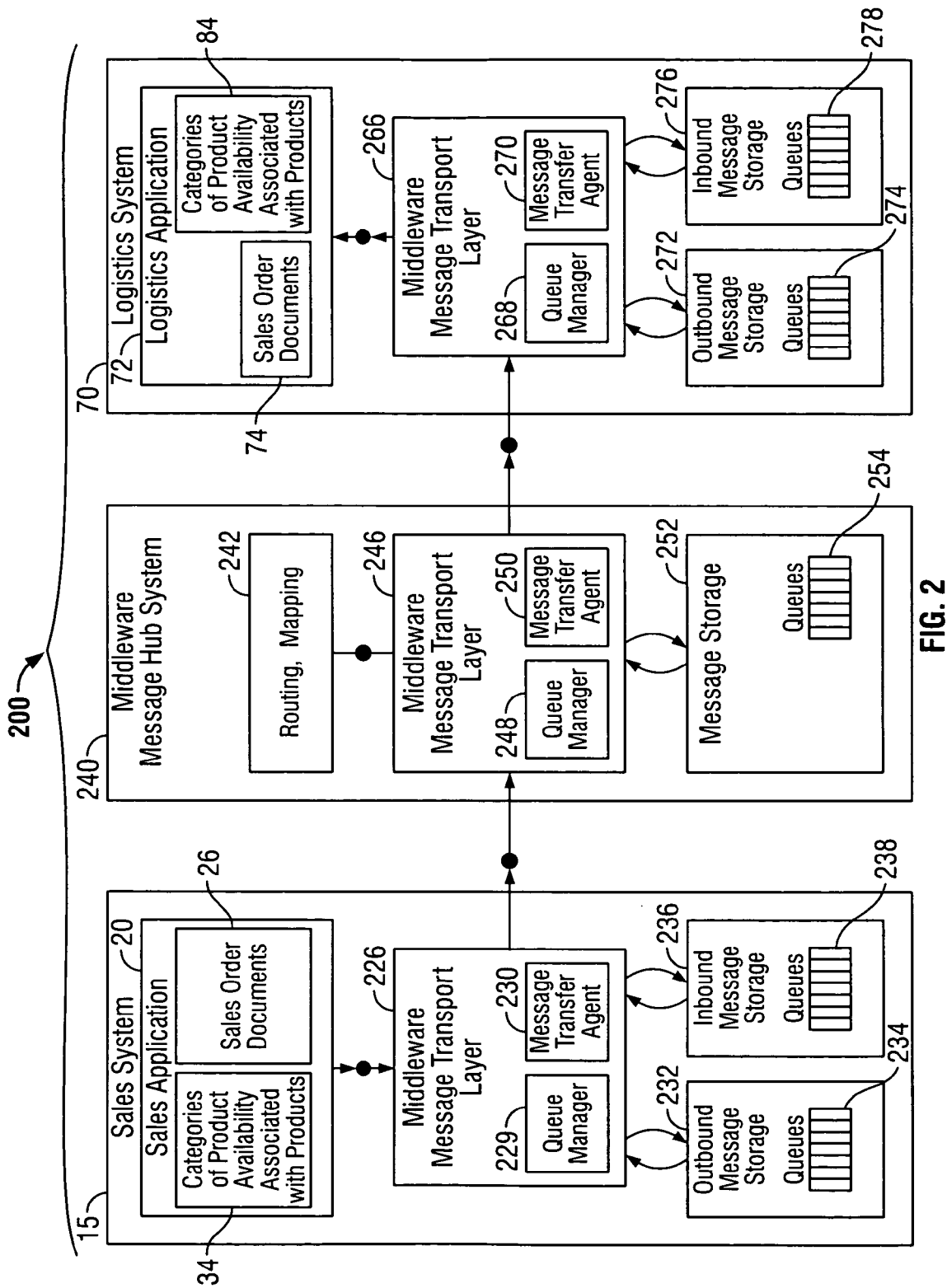

FIG. 2 illustrates an enterprise IT system 200 that includes three networked computing systems, which in this example are a sales system 15, a middleware message hub system 240, and a logistics system 70. For brevity, the structure and arrangement of FIG. 2 is based on the structure and arrangement of FIG. 1. As would be recognized by one skilled in the art, however, the components and processes of FIG. 2 need not be the same as those described with respect to FIG. 1, nor are the techniques described with respect to FIG. 2 limited to being performed by the structure and arrangement illustrated by FIG. 2.

Messages containing enterprise application data are transferred asynchronously from the sales system 15 and eventually to the logistics system 70, either directly or by way of the middleware message hub system 240 as is depicted in FIG. 2. The messages are exchanged using a messaging system (that is, middleware) using store-and-forward message transfer.

The sales system 15 includes the sales application 20 having categories 34 of product availability associated with products and sales order documents 26, as described in FIG. 1, and a middleware message transport layer 226, which is part of the previously mentioned messaging system, or middleware, for the enterprise IT system 200. Information, such as a sales order document of sales order documents 26 that needs to be forwarded to another system, such as the logistics system 70, first gets forwarded, or "posted," by the sales application 20 to the middleware message transport layer 226. This is illustrated in FIG. 2 by arrows shown from the sales application 20 to the middleware message transport layer 226. The information is forwarded in a message, and, in the case when a sales order document is forwarded, the information included in the message may be the sales order document itself, may be another document including only selected data from the sales order document, or may be yet another document derived from, or calculated from, information in the sales order document. For example, the message may contain the previously mentioned delivery request information that is pulled from, or derived from, the sales order document where the delivery request information includes only the information needed by the logistics system 70 to effect delivery of the purchased item. As an example of information included in a message that is derived from the sales order document, suppose the sales application 20 holds a sales order document of sales order documents 26 with n line items. In that case a message could contain an aggregated view of the sales order with a sum of prices over all line items, instead of all line items individually. As such, the derived information (or document) and the object (or document) from which the derived document is based may look similar but they need not be identical. Whatever the case may be, the information contained in the message will be referred to herein as a document.

The middleware message transport layer 226 includes a queue manager 229, a message transfer agent 230, an outbound message storage 232 which includes a number of queues 234, and an inbound message storage 236 which also includes a number of queues 238. Briefly, the queue manager 229 processes a posted message and stores the message in a queue within the outbound message storage 232.

A separate queue in the queues 234 is used for each different type of document that is posted as a message by the sales application 20 to the middleware message transport layer 226. For example, in the example where a message includes a sales order document (or delivery execution request document) and another message includes a customer information document, there would be one queue for the sales order document and a different queue for the customer information document. In such a case, one document type is customer information, and another document type is sales order. Other examples of document types include employees, organizations, and business partners. Business partner is a broad category that includes persons (including employees and customers), organizations, and groups of persons or organizations that are involved in using the application or enterprise system.

The message transfer agent 230 controls the forwarding of messages from the outbound message storage 232 for eventual receipt by the logistics system 70. In the FIG. 2 example, it is shown that the messages are forwarded first to the middleware message hub system 240 en route to the logistics system 70. This is just an example of how a message may be routed to another system. Alternatively, messages may be transferred directly between systems 15 and 70.

The middleware message hub system 240 serves as a central messaging center for the entire enterprise IT system 200. In many cases it is desirable to utilize such a middleware message hub system 240. For example, a system within the enterprise system 200 may send messages to several other systems. Instead of having a direct connection to each system to which the system transfers messages, the system need only be interconnected with the middleware message hub system 240. Then from the middleware message hub system 240, the message may be forwarded to its eventual destination. It will be appreciated that in FIG. 2, for simplicity, only two systems 15 and 70 and associated applications 20 and 72 are shown, but in an actual enterprise IT system, there may be many more systems and applications, and each system may communicate with multiple other systems within the overall enterprise IT system. For example, there may be one or more sales system 15, some of which may be distributed or mobile computing systems, described earlier. The message hub system 240 includes a routing and mapping application 242 and a middleware message transport layer 246. The routing and mapping application 242 performs two main functions. First, the application 242 determines where a received message is to be forwarded, or routed, to reach its ultimate destination. Second, the application 242 performs a mapping function, if necessary. For example, if the data format used by the logistics system 70 differs from that used by the sales system 15, then the application 242 may translate the format for a received message into a format that can be understood by the logistics system 70.

The message hub system's middleware message transport layer 246 is part of the previously mentioned messaging system, or middleware, for the enterprise IT system 200, and is similar in function to the middleware message transport layer 226 in the sales system 15. The middleware message transport layer 246 includes a queue manager 248, a message transfer agent 250, and message storage 252 that includes a number of queues 254. The queue manager 248 processes a received message and stores the message in a queue within the message storage 254. As with the sales system middleware message transport layer 226, a separate queue in the queues 254 is used for each different type of document that is received. The message transfer agent 250 controls the forwarding of messages from the message storage 252 for eventual receipt by the logistics system 70. In the FIG. 2 example, it is shown that the messages are forwarded from the middleware message hub system 240 directly to the logistics system 70. In some implementations, the message hub system 240 may include separate inbound and outbound message stores.

The logistics system 70 includes a logistics application 72 storing sales order documents 74 and categories 84 of product availability associated with products, as described in FIG. 1. The logistics system 70 also includes a middleware message transport layer 266, which is part of the previously mentioned messaging system, or middleware, for the enterprise IT system 200. The middleware message transport layer 266 is similar in function to the middleware message transport layers 226 and 246 in the sales system 15 and in the middleware message hub system 40, respectively. In particular, the middleware message transport layer 266 includes a queue manager 268, a message transfer agent 270, an outbound message storage 272 that includes a number of queues 274, and inbound message storage 276 that also includes a number of queues 278. The queue manager 268 processes a received message and stores the message in a queue within the inbound message storage 276. As with the sales system middleware message transport layer 226 and the message hub system middleware message transport layer 246, a separate queue in the queues 278 is used for each different type of document that is received. The message transfer agent 270 controls the forwarding of messages from the inbound message storage 276 for eventual processing by the logistics application 72.

Turning now to using the middleware messaging system to transmit a category of product availability form the logistics system 70 to the sales system 15, the logistics application 72 forwards the message or messages having some or all of the categories 84 to the middleware message transport layer 266, where the queue manager 268 processes the posted message or messages and stores the message or messages in one of the queue 274 of the outbound message storage 272. The message transfer agent 270 controls the forwarding of messages from the outbound message storage 274 to the middleware message hub system 240. As previously described, the queue message manager 248 of the middleware message hub system 240 processes the received message, and the message transfer agent 250 controls the forwarding of the messages from the message storage 252 for eventual receipt by the sales system 15. The queue manager 229 of the middleware message transport layer 226 of the sales system 15 processes the received message and stores the message in one of queues 238 of inbound message storage 236. The message transfer agent 230 controls the forwarding of messages from the queues 238 of the inbound message storage 236 for eventual processing by the sales application 20. The sales application stores the information sent in the message or messages in categories 34 of product availability associated with products.

Figure 3:
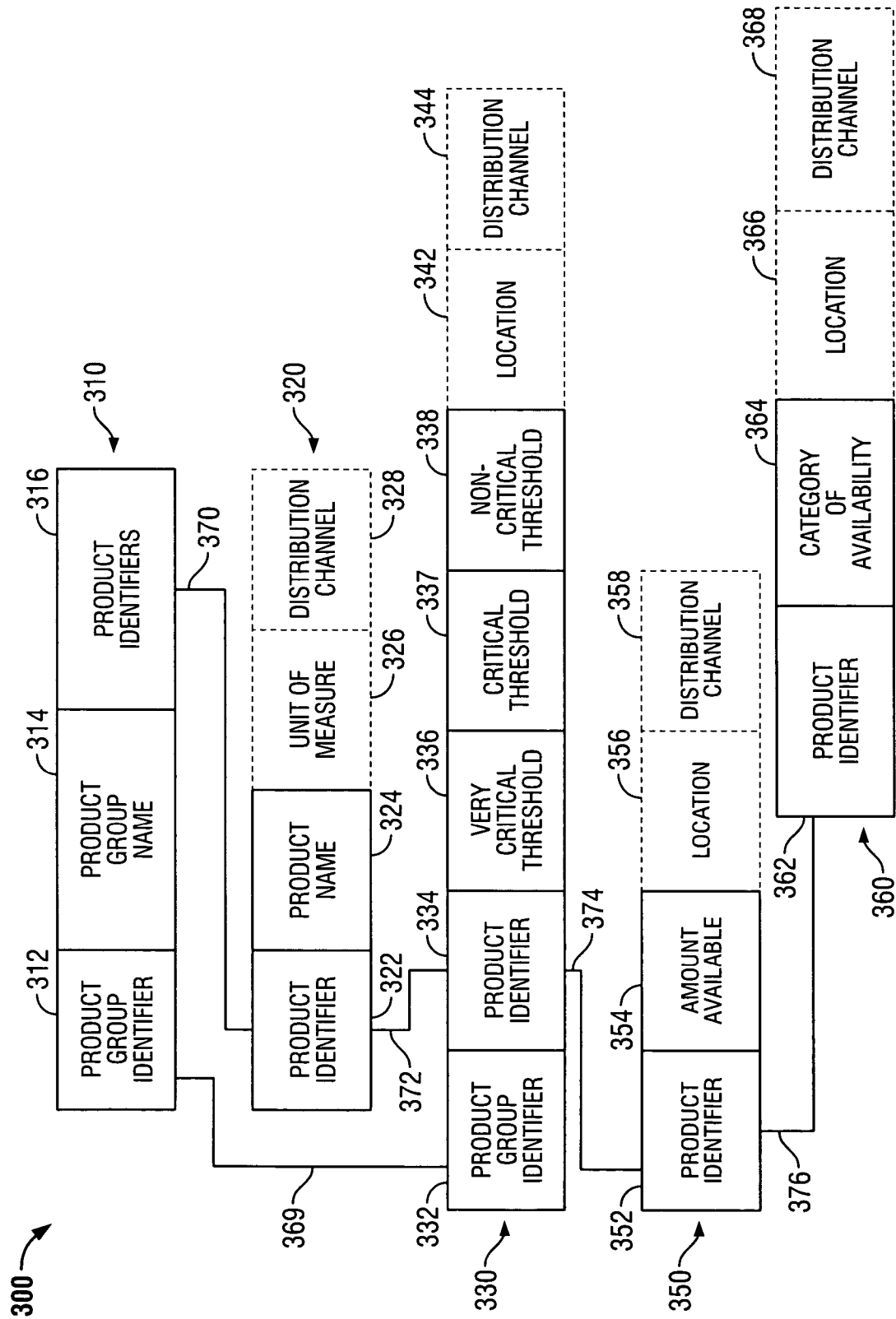
FIG. 3 is a diagram illustrating a data structure for providing product availability information.

Before discussing the additional detail regarding the method by which product availability is checked within the enterprise IT systems described in FIGS. 1 or 2, it is first helpful to describe an example format that may be used for providing product availability information. Referring to FIG. 3, an example data structure 300 is shown, in simplified form. In FIG. 3, the data structure 300 for providing product availability information includes product group information 310 that may be, for example, an implementation of product groups 35 or 85 in FIG. 1. The product group information 310 includes, for each entry of a product group information 310, a product group identifier 312 that uniquely identifies a particular product group or entry, a product group name 314 for the product group entry, and product identifiers 316 that identify the products that are associated with the product group entry—that is, the product that are included in the product group.

The data structure 300 also includes product information 320 that may be, for example, an implementation of products 32 or 82 in FIG. 1. The product information 320 includes, for each entry, a product identifier 322 that uniquely identifies the particular product entry and a product name 324 for the particular product. The product information 320 also may include a unit of measure 326 for a product entry that identifies the unit of measure by which the product is sold. For example, the unit of measure for a beverage product that is sold in cans or bottles may be a carton of cans or bottles, whereas the unit of measure for a fresh produce product may be a bushel. In another example, the unit of measure for a pencil may be a box of pencils. The product information 320 also may include an indication 328 of the distribution channel 328 that may be used for the product entry. A distribution channel, for example, may indicate the mode by which a sale is made. Examples of such distribution channels are a sale that is entered by a customer using the Internet, a call-center sale that is entered by a call center representative based on a telephone conversation with a customer, or a sale that is entered by a sales representative based on a visit with the customer at the customer's location. Another example of a distribution channel indicates a geographic region in which the sale is made. Examples of such distribution channels include an eastern sales region, a western sales region, and a particular country.

The data structure 300 also includes threshold information 330 that may be, for example, an implementation of thresholds 87 for categories of product availability in FIG. 1. The threshold information 330 may include a product group identifier 332 or a product identifier 334 to identify a product group or a product to which a particular entry of threshold information 330 applies. When an entry of threshold information 330 includes a value for the product group identifier 332, the entry of threshold information generally applies to all of the products that are included in the identified product group (except in some circumstances that are described more fully later). When an entry of threshold information 330 includes a value for the product identifier 334, the entry of threshold information applies to the identified product.

The threshold information 330 includes thresholds 336-338 for determining which of several categories of product availability apply to an in-stock quantity of the product. In this example, there are three categories of product availability and each category is associated with one of the thresholds 336-338 that represents a division of an in-stock quantity. In particular, there is a very-critical threshold 336 used to determine whether a particular in-stock quantity corresponds to a category of very critical; a critical threshold 337 used to determine whether a particular in-stock quantity corresponds to a category of critical; and a non-critical threshold 338 used to determine whether a particular in-stock quantity corresponds to a category of non-critical. In some implementations, one of the categories need not necessarily be associated with a explicit threshold. In such a case, an in-stock quantity may be determined to be associated with a category without an explicit threshold when the in-stock quantity does not correspond to an explicit threshold. The category may be referred to as having an implicit threshold. In the example of FIG. 3, a non-critical threshold 338 may be an implicit threshold that is implied based on a particular inventory amount not meeting either of the critical threshold 337 or the very critical threshold 338. In such a case, the value of non-critical threshold 338 may be blank, null or zero, or the non-critical threshold 338 may be missing from the data structure 300. In one example of a canned beverage product sold in cases, the very critical threshold 336 may be a threshold of less than one hundred cases available for sale, a critical threshold 337 may be a threshold of between one hundred and one thousand cases available for sale; and the non-critical threshold 338, when an explicit threshold is used, may be a threshold of more than one thousand cases available for sale.

An entry of the threshold information 330 optionally includes a location indicator 342 that limits the products to which the thresholds 336-338 apply. For example, when an entry of the threshold information 330 includes a location indicator 342, the thresholds 336-338 apply to the products identified by the product type identifier 334 (or indirectly identified by the product group identifier 332) that are located at a particular location (such as a distribution point or a warehouse) identified by the location indicator 342. The use of a location indicator 342 may be particularly useful when sales patterns vary significantly between different locations or when locations are widely geographically dispersed.

Similarly, an entry in the threshold information 330 may include a distribution channel indicator 344 that identifies a distribution channel for the product to which the thresholds 336-338 apply. For example, one distribution channel may be Internet sales that are fulfilled in a particular manner, and another distribution channel may be call center sales that are fulfilled in an expedited manner as compared to the manner used to fulfill Internet sales orders. In such a case, the thresholds 336-338 that apply to a product related to a call-center-sales distribution channel may be different than the thresholds 336 338 that apply to a product related to an Internet-sales distribution channel. This may be particularly useful when delivery times or product availability vary substantially between distribution channels.

The data structure 300 also includes inventory information 350 that may be, for example, an implementation of inventory information 78 in FIG. 1. The inventory information 350, for each entry, includes a product identifier 352 that identifies a product to which the amount available 354 applies. An entry in the inventory information 350 optionally may include a location indicator 356 and a distribution channel indicator 358 that may be used to indicate a portion of the product to which the amount available 354 applies. For example, when a value is included in the location indicator 356 or the distribution channel indicator 358, the amount available 354 indicates the amount of product that is available in the location indicated by the location indicator 356 or the distribution channel indicator 358, respectively.

The data structure 300 also includes product-availability-category information 360 that may be, for example, an implementation of categories 34 or 84 of product availability associated with products in FIG. 1. The product-availability-category information 360 includes, for each entry, a product identifier 362 that identifies a product to which the category of availability 364 applies. The product-availability-category information 360 optionally includes a location indicator 366 and a distribution channel indicator 368 that may be used to indicate a portion of products to which the category of availability 364 applies. In one example, the category of availability 364 may apply to a particular product that is identified by the product identifier 362 that is located at a location identified by the location indicator 366. In another example, the category of availability 364 may apply to a particular product that is associated with a particular distribution channel identified by the distribution channel indicator 368.

Within the data structure 300, there exist linkages between the product group information 310, the product information 320, the threshold information 330, the inventory information 350, and the product-availability-category information 360. The linkages may take the form of common values for corresponding information. For instance, there is a link 369, using the product group identifiers 312 and 332, between the product group information 310 and the threshold information 330.

The product group identifiers 312 and 330, respectively, are included in both the product information 310 and the threshold information 330 and link the product information 310 and the threshold information 330. The link 369 enables, for example, the thresholds 336-338 to be determined for products that are identified by the product identifiers 316 of an entry of product group information 310.

As another example of linkages, product identifiers 316, 322, 334, 352 and 362, respectively, are included in the product group information 310, the product information 320, the threshold information 330, the inventory information 350, and the product-availability-category information 360. As a result, the product identifiers link the information 310, 320, 330, 350, and 360. More particularly, the product identifiers 316 and 322, respectively, are included in the product group information 310 and the product information 320. This enables product information 320 to be determined for an entry in the product group information 310, as shown by link 370. The product identifiers 322 and 334, respectively, are included in the product information 320 and the threshold information 330, which enables, for example, threshold information 330 to be determined for an entry in the product information 320, as shown by link 372. The product identifiers 334 and 352, respectively, are included in the threshold information 330 and the distribution channel information 350, which enables, for example, threshold information 330 to be determined for an entry in the inventory information 350, as shown by link 374. The product identifiers 352 and 362, respectively, are included in the inventory information 350 and the product-availability-category information 360, which enables, for example, an entry of product-availability-category information 360 to be stored for a particular entry of inventory information 350, as shown by link 376.

Figure 4:
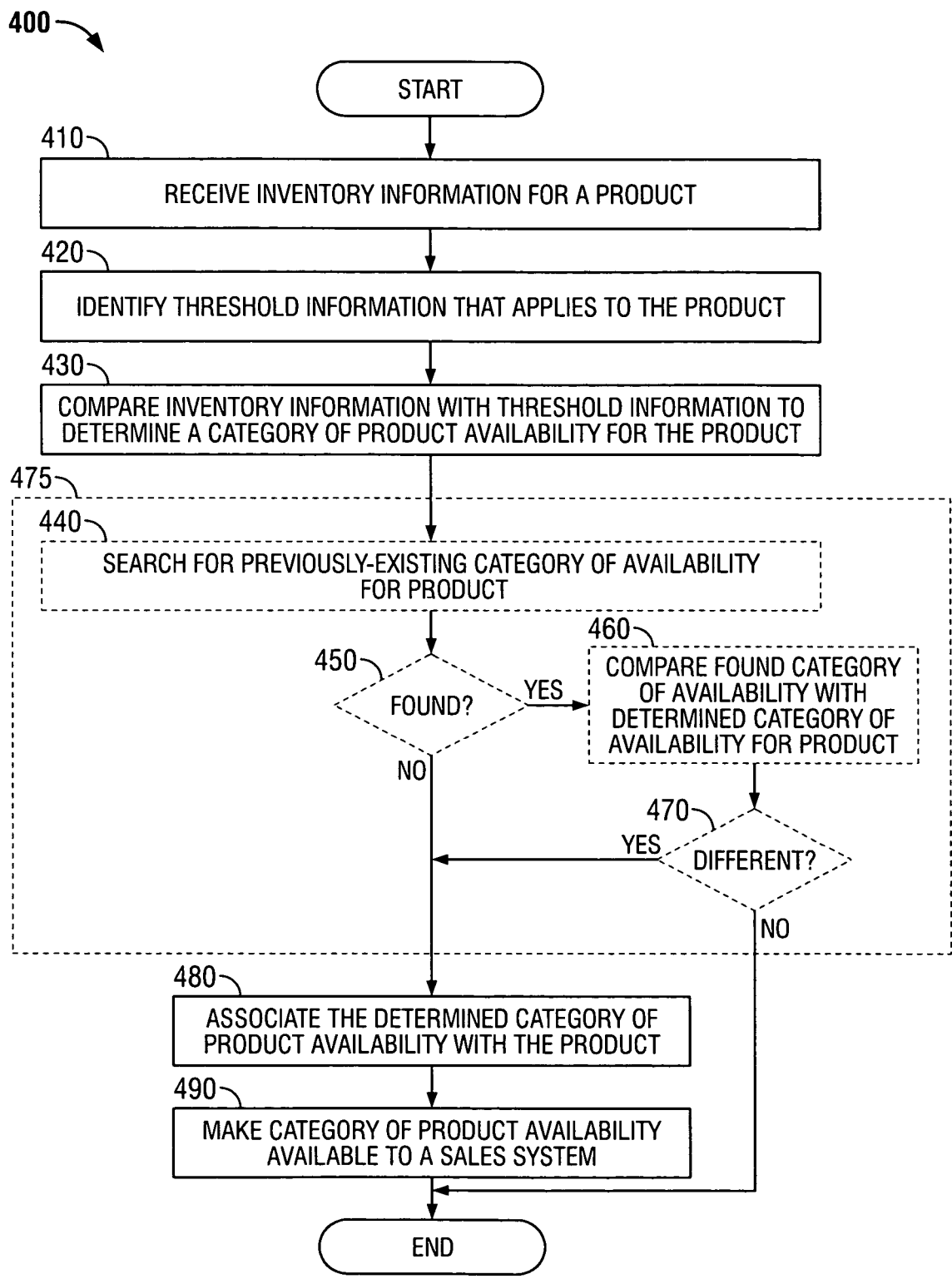
FIG. 4 is a flow chart illustrating a process for determining a category of product availability for a product.

FIG. 4 illustrates an automated process 400 for determining a category of product availability for a product. The process 400 may be performed by a processor on a computer system, such as the sales system 15, the sales system 18 or the logistics system 70 in FIG. 1. The processor is directed by a method, script or other type of computer program that includes executable instructions for performing the process 400 to determine a category of product availability for a product. An example of such a collection of executable instructions is the process 90 to determine categories of product availability in FIG. 1. In many cases, a logistics system 70 or a centralized sales system repeatedly performs the process 400 to determine a category of product availability for each of many products. The categories of product availability then may be provided to distributed sales systems (such as a mobile sales system) on a periodic basis, as described in FIGS. 1 and 2.

The process 400 may begin at a predetermined time and date (typically a recurring predetermined time and date), may begin when a predetermined condition is met (such as the definition of new threshold information or update of inventory information), or may be manually initiated by a system administrator or another type of user.

The processor executing the process 400 receives inventory information for a product (step 410). Using the data structure 300 of FIG. 3 by way of example only, the received inventory information may be an entry of inventory information 350 in FIG. 3. The processor identifies threshold information that applies to the product (step 420). Using the data structure 300 of FIG. 3 to illustrate, the processor may identify an entry in threshold information 330 based on the product identifier 352 of the entry of inventory information 350. More particularly, the processor may identify an entry in threshold information 330 that includes a product identifier 334 that matches the product identifier 352 of the received inventory information 350 entry.

When a threshold information 330 entry applies to a product group that includes the product identifier in product identifiers 316 that corresponds to the product identifier 352 of the received inventory information 350 entry, the processor also may need to traverse the link 369 to identify a product group information 310 entry that includes the product identifier to identify threshold information in step 420.

In some cases, there may be two threshold information 330 entries that may apply to the product and, in such a case, a conflict resolution rule or process must be applied to determine which entry of threshold information 330 applies to the product. One example of a conflict resolution rule in such a case may be that a threshold information 330 entry that applies to a product is to be used rather than a threshold information 330 entry that applies to a product group, as described previously.

The processor then compares the received inventory information with the threshold information to determine a category for product availability for the product (step 430). In the example of the FIG. 3 data structure, the amount available 354 of the inventory information 350 entry is compared to the thresholds 336-338 until a threshold with a range containing the amount available 354 is found. When the amount available 354 is within the very critical threshold 336, the processor determines a category of availability 364 of very critical. Similarly, when the amount available 354 is within the critical threshold 337, the processor determines a category of availability 364 of critical. When the amount available 354 is within the non-critical threshold 338, the processor determines a category of availability 364 of non-critical.

The processor optionally searches for a previously-existing category of availability for the product (step 440) and, when found, the found category of availability is compared with the category of product availability determined in step 430 (step 460). Only when the determined category of product availability for the product is different from the found category of availability (that is—a previously existing category of availability for the product) (step 470) or a previously existing category of availability is not found for the product (step 450) does the processor associate the determined category of availability with the product (step 480). By associating the determined category of availability with the product only when the determined category differs from a previously existing category or when a category did not previously exist, the efficiency of the process 400 may be improved by only sending a category of product availability to the sales system when the category has been changed or is new.

In the example of the data structure 300 in the FIG. 3, the processor searches the product-availability-category information 360 for an entry that includes a product identifier 362 having the same value as the product identifier 352 of the inventory information 350 entry received in step 410 (step 450). When an entry in the product-availability-category information 360 is found, the category of product availability 364 of the found entry is compared with the category of product availability determined in step 430 to determine whether the categories of product availability are the same (step 460). When the categories of product availability are the same (step 460), the process 400 ends.

However, when the determined category of product availability for the product is different from the found category of availability 364 or an entry in the product-availability-category information 360 is not found in step 450, the processor associates the determined category of product availability with the product (step 480). To do so in the case when the entry in product-availability-category information 360 is not found, the processor creates an entry in the product-availability-category information 360 having (1) a product identifier 362 value that matches the product identifier 352 of the entry in inventory information 350 received in step 410 and (2) a category of availability 364 value that matches the category of availability determined in step 430. In the case that category of availability 364 in the found entry is different, the processor modifies the found entry in the product-availability-category information 360 so that the category of availability 364 value matches the category of availability determined in step 430.

The processor then makes the determined category of product availability available to a sales system (step 490). This may be accomplished, for example, when the processor transmits the determined category of product availability and an identification of the associated product to a sales system, such as by sending an appropriate message to the sales system using a middleware messaging system, such as the enterprise IT system 200 in FIG. 2. Alternatively or additionally, the determined category of product availability may be made available when a sales system requests the determined category of product availability and the processor transmits the determined category of product availability to the sales system. The steps 440-470 are optional steps and are used to identify a change in a category of product availability, which may be referred to as a "delta." When the process 400 includes the optional sub-process 475, only the "deltas" or changes in categories of product availability are sent to the sales system. This may, in turn, result in a more efficient transmission of categories of product availability to the sales system.

The techniques and concepts of process 400 may be applied in other contexts. In one example of such a context, an indication of a product may be received in lieu of inventory information for a product. In such a case, an available amount of the product may be identified for the product and a product availability category may be determined based on threshold information for the product and the available amount of the product. In another example, threshold information and inventory information may include a location or a distribution channel. In such cases, a category of product availability is determined for a product at a location or a product in a distribution channel.

Figure 5:
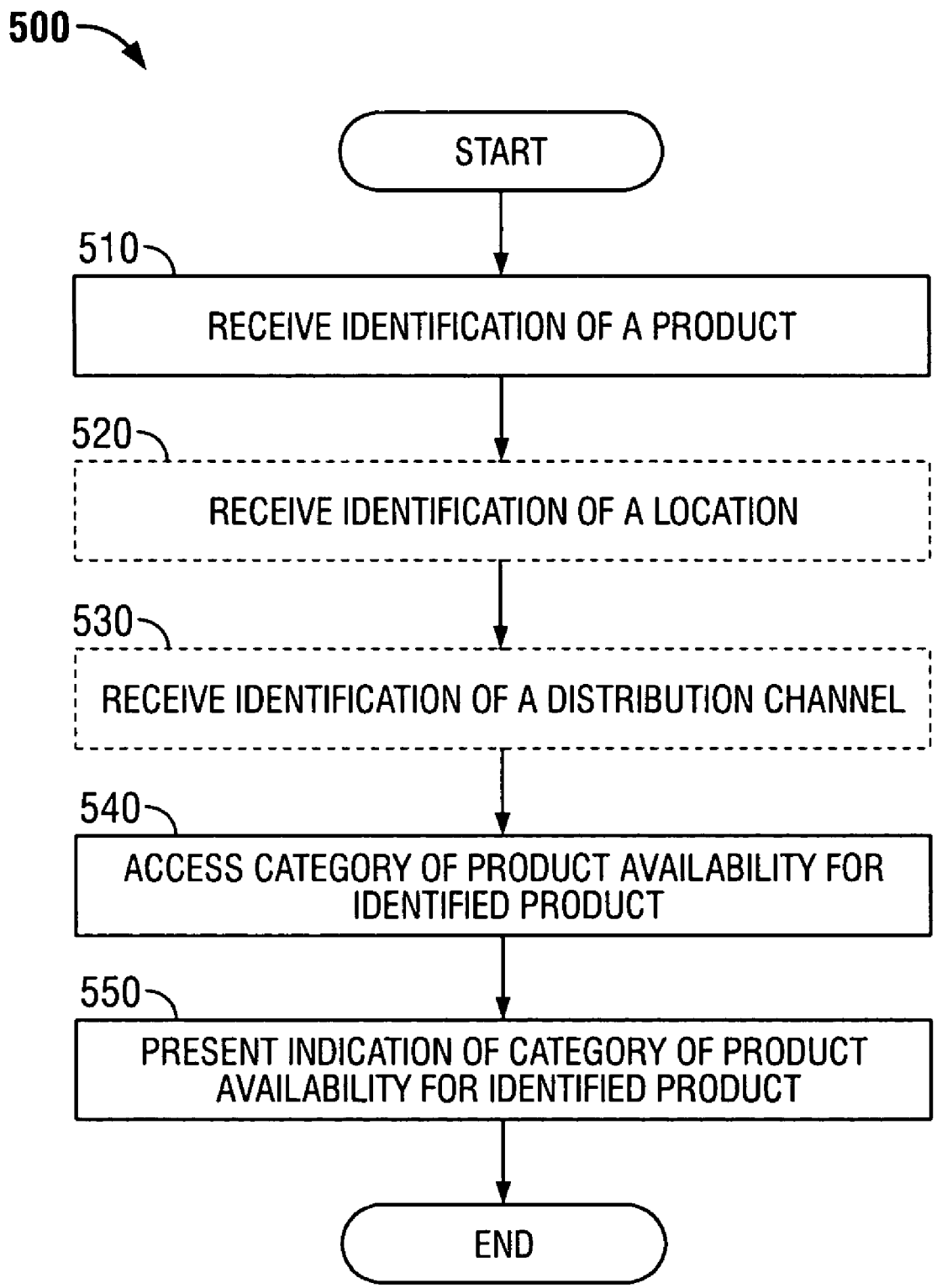
FIG. 5 is a flow chart depicting a process for using an offline computer to check the availability of a product.

FIG. 5 illustrates an automated process 500 for checking availability of a product. The process 500 may be performed by a processor on a offline computer system, such as the sales system 15 or the sales system 18. The process 500 may be referred to as an offline stock check. The processor is directed by a method, script or other type of computer program that includes executable instructions for performing the process 500 to check product availability. An example of such a collection of executable instructions is the process 37 to check product availability in FIG. 1.

The process 500 begins when the processor receives an identification of a product for which an offline stock check is to be performed (step 510). The identification of the product, for example, may be a product identifier or a product name for a product, such as product identifier 322 or product name 324 of product information 320 in FIG. 3. The identification of the product may be received programmatically, for example, when the computer program for the process 500 is called by a computer program that provides a calling parameter that identifies a product. The identification of the product also may be received as a result of user input of an identification of a product. Examples of user input include direct entry of a product identifier and a selection from multiple possible products. Optionally, the processor receives an identification of a distribution channel (step 520) or an identification of a location (step 530).

The processor accesses the category of product availability for the identified product (step 540). In one example, when an identification of a product is received (but not an identification of a distribution channel or a location), the category of availability for the identified product entry is based on the identified product. In another example, when an identification of a product and an identification of a distribution channel are received, the category of availability for the identified product entry is based on the identified product and the identified distribution channel. In yet another example, when an identification of a product and an identification of a location are received, the category of availability for the identified product entry is based on the identified product and the identified location.

The processor presents an indication of the accessed category of product availability (step 550). This may be accomplished, for example, when the category of product availability is displayed on a user interface or printed using a printer associated with the sales system. The indication of the category of product availability may be presented in other ways, such as by presenting a symbol that corresponds to a category or presented color-coded text of the product identifier or product name in which the color corresponds to a category. For example, a traffic light symbol may be used to indicate the accessed category of product availability. Continuing to use the illustrative categories described in FIG. 3, a non-critical category may be represented by a green traffic light symbol, a critical category may be represented by a yellow traffic light symbol, and a very-critical category may be represented by a red traffic light symbol.

In some implementations, categories of product availability for multiple products in an identified product group may be accessed and presented. To do so, the processor may receive an identification of a product group and repeatedly execute substantially the same steps or analogous steps as shown in process 500 to present the category of product availability for each of the products associated with the identified product group.

Figure 6:
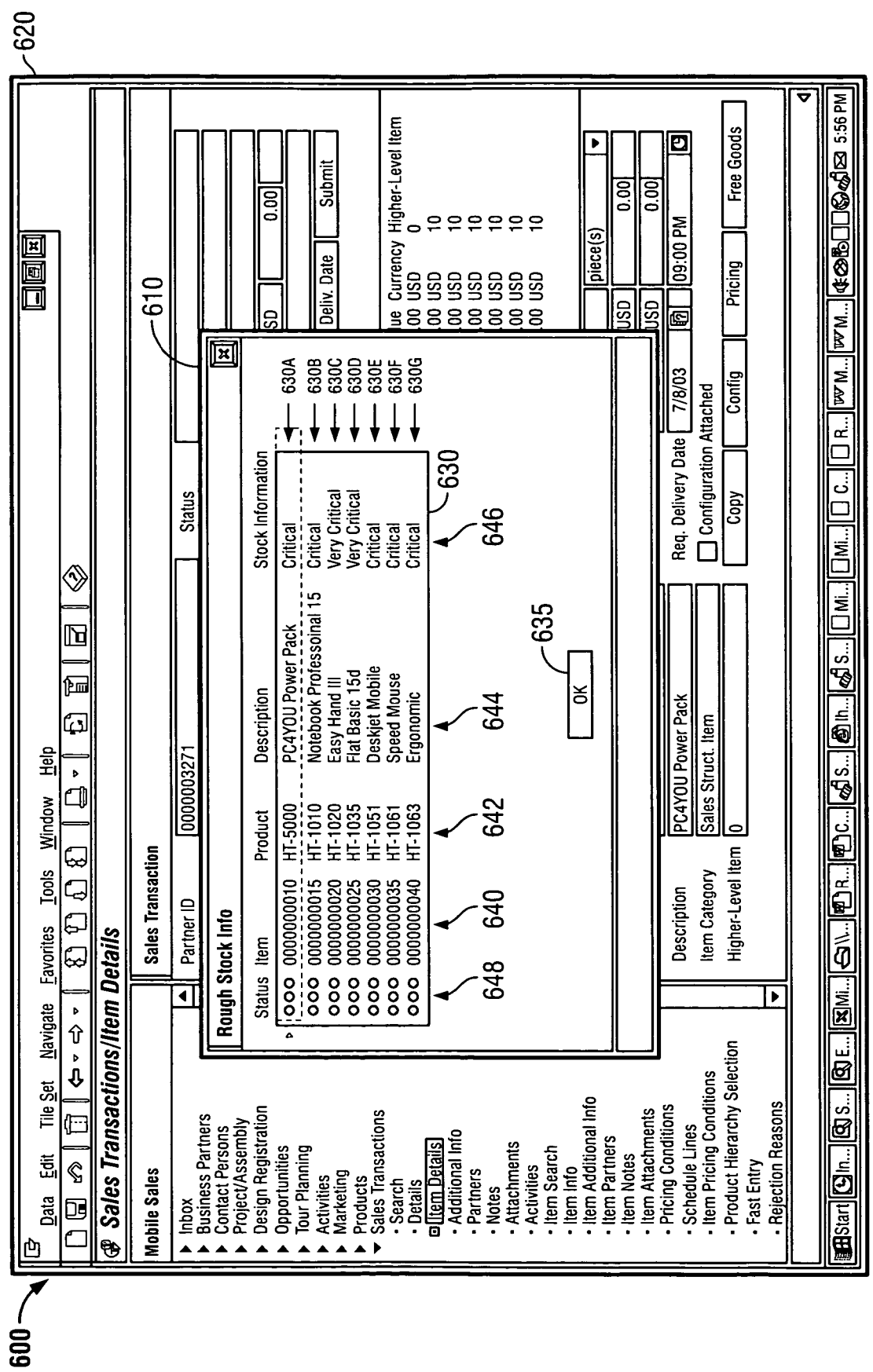
FIG. 6 is a screen snapshot showing a user interface for presenting results of checking the availability of a product.

FIG. 6 illustrates an example of a user interface 600 that includes a window 610 that displays the results of an offline product availability check (here, called "rough stock info"). The user interface 600 may be generated, for example, by a sales application operated on a mobile sales system that is not connected to another system, as described previously in FIG. 1. As is conventional, a salesperson may enter, view or revise a sales order using the sales transaction window 620 and desire to check product availability for the sales order. In response to the salesperson's command, the window 610 that shows the results of an offline product availability check is displayed.

The window 610 includes a data portion 630 showing product availability for a list of products (such as the products included in a particular sales order) and a control 635 operable to hide the window 610 from the user interface 600 and enable an unobstructed view of the sales transaction window 620. The data portion 630 includes product availability information for multiple products 630A-630G. The information related to each of the products 630A-630G includes a product identifier 640, a product name 642 (which may be an implementation of product name 324 in FIG. 3), a product description 644, a category of product availability 646 (which may be an implementation of category of availability 364 in FIG. 3), and a status symbol 648 representing the category of availability. In this example, the category of product availability is called "stock information" and each status symbol 648 corresponds to a traffic light symbol representing the category of availability, as described previously.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a computer readable medium, the computer program product including instructions that, when executed, perform an off-line product availability check at a user computer, the computer program product configured to:
   in an on-line mode in which a user computer system is able to receive information from a host computer system, receive, at the user computer system, product availability data associated with a plurality of different products, the product availability data comprising, for each of the plurality of different products, a determined one of multiple different availability categories as determined by the host computer system, the received product availability data not also comprising a quantity of product available for each of the plurality of products;
   store the received product availability data in a data collection stored on the user computer system, the received product availability data comprising the determined one of multiple different available categories for each of the plurality of products;
   receive an input identifying one or more particular products corresponding to the stored product availability data in the data collection stored on the user computer system;
   in an off-line mode in which the product availability data on the host computer system is not accessible by the user computer system:
      perform, on the user computer system an off-line product availability check for the one or more particular products, the off-line product availability check comprising retrieving, from the data collection, the stored product availability data for the one or more particular products of which the off-line product availability check is being performed including the determined one of the plurality of availability categories for each of the one or more of the plurality of particular products, and
      provide a visual display on the user computer system of the determined one of the plurality of availability categories for each of the one or more of the plurality of particular products, the displayed availability categories being the availability category for the product as determined by the host computer system.

2. The computer program product of claim 1 further configured to:
   in an off-line mode in which the product availability data on the host computer system is not accessible by the user computer system, access a second data collection on the host computer system, the second data collection including:
      product availability data including product availability entries, each product availability entry being associated with an amount of product that is available and a determined one of multiple different availability categories based on the amount of product that is available, and
      threshold information that includes a threshold entry for each of the multiple different availability categories wherein each threshold entry is associated with a product availability entry;
   use threshold entries to determine, based on an amount of a product that is available, the determined one of multiple different availability categories for the product availability entry that is associated with the product;
   associate the determined one of multiple different availability categories with the product availability entry; and
   transmit the product availability entry including the determined one of multiple different availability categories for the product availability entry to the user computer system.

3. The computer program product of claim 2 further configured to store the determined one of multiple different availability categories and the association of the determined one of multiple different availability categories with the product availability entry in the second data collection.

4. The computer program product of claim 2 wherein: the second data collection includes product group information, each product group entry is associated with (a) product availability entries, and (b) threshold entries for determining one of multiple different availability categories for product availability entries that are associated with the product group entry; and the computer program product is further configured to use the threshold entries associated with a particular product group entry to determine a one of multiple different availability categories for at least one product availability entry that is associated with the particular product group.

5. The computer program product of claim 2 further configured to determine a one of multiple different availability categories based on an implicit threshold for the one of multiple different availability categories derived from at least one threshold entry of the second data collection.

6. The computer program product of claim 2 wherein:

each product availability entry in the data collection is associated with a distribution channel;

each product availability entry in the product availability data of the second data collection is associated with an amount of product that is available in one of multiple distribution channels;

threshold information includes threshold entries for each of the one of multiple different availability categories wherein each threshold is associated with a product availability entry that includes a particular distribution channel; and the computer program product is further configured to:

use the threshold entries for each one of multiple different availability categories for a product availability entry and an associated distribution channel to determine, based on an amount of product that is available in the distribution channel, the determined one of multiple different availability categories for the product availability entry;

associate the determined one of multiple different availability categories and the associated distribution channel with the product availability entry, and transmit the determined one of multiple different availability categories for the product availability entry associated with the distribution channel to the user computer system.

7. The computer program product of claim 2 wherein:

each product availability entry in the data collection is associated with a location, each product availability entry in the product availability data of the second data collection is associated with an amount of product that is available in one of multiple locations, each threshold entry in the threshold information is associated with a product availability entry that includes a particular location; and the computer program product is further configured to:

use the threshold entries for each one of multiple different availability categories for a product availability entry and an associated location to determine, based on an amount of product that is available in the location, the determined one of multiple different availability categories for the product availability entry, associate the determined one of multiple different availability categories and the associated location with the product availability entry; and transmit the determined one of multiple different availability categories for the product availability entry associated with the location to the user computer system.

8. The computer program product of claim 2 further configured to use a middleware messaging system for routing messages that include multiple different availability categories between the user computer system and the second computer system.

9. A computer-implemented method for performing an off-line product availability check at a user computer, the method comprising:

in an on-line mode in which a user computer system is able to receive information from a host computer system, receiving, at the user computer system, product availability data associated with a plurality of different products, the product availability data comprising, for each of the plurality of different products, a determined one of multiple different availability categories as determined by the host computer system, the received product availability data not also comprising a quantity of product available for each of the plurality of products;

storing the received product availability data in a data collection stored on the user computer system, the received product availability data comprising the determined one of multiple different available categories for each of the plurality of products;

receiving an input identifying one or more particular products corresponding to the stored product availability data in the data collection stored on the user computer system;

in an off-line mode in which the product availability data on the host computer system is not accessible by the user computer system:

performing, on the user computer system an off-line product availability check for the one or more particular products, the off-line product availability check comprising retrieving, from the data collection, the stored product availability data for the one or more particular products of which the off-line product availability check is being performed including the determined one of the plurality of availability categories for each of the one or more of the plurality of particular products, and providing a visual display on the user computer system of the determined one of the plurality of availability categories for each of the one or more of the plurality of particular products, the displayed availability categories being the availability category for the product as determined by the host computer system.

10. The method of claim 9 further comprising:

in an off-line mode in which the product availability data on the host computer system is not accessible by the user computer system, accessing a second data collection on the host computer system, the second data collection including:

product availability data including product availability entries, each product availability entry being associated with an amount of product that is available and a determined one of multiple different availability categories based on the amount of product that is available, and threshold information that includes a threshold entry for each of the multiple different availability categories wherein each threshold entry is associated with a product availability entry;

using threshold entries to determine, based on an amount of a product that is available, the determined one of multiple different availability categories for the product availability entry that is associated with the product;

associating the determined one of multiple different availability categories with the product availability entry; and transmitting the product availability entry including the determined one of multiple different availability categories for the product availability entry to the user computer system.

11. The method of claim 10 further comprising storing the determined one of multiple different availability categories and the association of the determined one of multiple different availability categories with the product availability entry in the second data collection.

12. The method of claim 10 wherein the second data collection includes product group information, each product group entry is associated with (a) product availability entries, and (b) threshold entries for determining one of multiple different availability categories for product availability entries that are associated with the product group entry; and
the method further comprising using the threshold entries associated with a particular product group entry to determine a one of multiple different availability categories for at least one product availability entry that is associated with the particular product group.

13. The method of claim 10 further comprising determining one of multiple different availability categories based on an implicit threshold for the one of multiple different availability categories derived from at least one threshold entry of the second data collection.

14. The method of claim 10 wherein:
each product availability entry in the data collection is associated with a distribution channel;
each product availability entry in the product availability data of the second data collection is associated with an amount of product that is available in one of multiple distribution channels;
threshold information includes threshold entries for each of the one of multiple different availability categories wherein each threshold is associated with a product availability entry that includes a particular distribution channel; and
the method further comprising:
using the threshold entries for each one of multiple different availability categories for a product availability entry and an associated distribution channel to determine, based on an amount of product that is available in the distribution channel, the determined one of multiple different availability categories for the product availability entry;
associating the determined one of multiple different availability categories and the associated distribution channel with the product availability entry, and
transmitting the determined one of multiple different availability categories for the product availability entry associated with the distribution channel to the user computer system.

15. The method of claim 10 wherein:
each product availability entry in the data collection is associated with a location,
each product availability entry in the product availability data of the second data collection is associated with an amount of product that is available in one of multiple locations,
each threshold entry in the threshold information is associated with a product availability entry that includes a particular location; and
the method further comprising:
using the threshold entries for each one of multiple different availability categories for a product availability entry and an associated location to determine, based on an amount of product that is available in the location, the determined one of multiple different availability categories for the product availability entry,
associating the determined one of multiple different availability categories and the associated location with the product availability entry; and
transmitting the determined one of multiple different availability categories for the product availability entry associated with the location to the user computer system.

16. The method of claim 10 further comprising using a middleware messaging system for routing messages that include multiple different availability categories between the user computer system and the second computer system.

17. A system for performing an off-line product availability check at a user computer, the system being configured to:
in an on-line mode in which a user computer system is able to receive information from a host computer system, receive, at the user computer system, product availability data associated with a plurality of different products, the product availability data comprising, for each of the plurality of different products, a determined one of multiple different availability categories as determined by the host computer system, the received product availability data not also comprising a quantity of product available for each of the plurality of products;
store the received product availability data in a data collection stored on the user computer system, the received product availability data comprising the determined one of multiple different available categories for each of the plurality of products;
receive an input identifying one or more particular products corresponding to the stored product availability data in the data collection stored on the user computer system;
in an off-line mode in which the product availability data on the host computer system is not accessible by the user computer system:
perform, on the user computer system an off-line product availability check for the one or more particular products, the off-line product availability check comprising retrieving, from the data collection, the stored product availability data for the one or more particular products of which the off-line product availability check is being performed including the determined one of the plurality of availability categories for each of the one or more of the plurality of particular products, and
provide a visual display on the user computer system of the determined one of the plurality of availability categories for each of the one or more of the plurality of particular products, the displayed availability categories being the availability category for the product as determined by the host computer system.

18. The system of claim 17 wherein the system is further configured to:
in an off-line mode in which the product availability data on the host computer system is not accessible by the user computer system, access a second data collection on the host computer system, the second data collection including:
product availability data including product availability entries, each product availability entry being associated with an amount of product that is available and a determined one of multiple different availability categories based on the amount of product that is available, and threshold information that includes a threshold entry for each of the multiple different availability categories wherein each threshold entry is associated with a product availability entry;

use threshold entries to determine, based on an amount of a product that is available, the determined one of multiple different availability categories for the product availability entry that is associated with the product;

associate the determined one of multiple different availability categories with the product availability entry; and transmit the product availability entry including the determined one of multiple different availability categories for the product availability entry to the user computer system.

19. The system of claim 18 wherein:

the second data collection includes product group information, each product group entry is associated with (a) product availability entries, and (b) threshold entries for determining one of multiple different availability categories for product availability entries that are associated with the product group entry; and the system is further configured to use the threshold entries associated with a particular product group entry to determine a one of multiple different availability categories for at least one product availability entry that is associated with the particular product group.

20. The system of claim 18 wherein the system is further configured to determine a one of multiple different availability categories based on an implicit threshold for the one of multiple different availability categories derived from at least one threshold entry of the second data collection.

* * * * *

UNITED STATES PATENT AND TRADEMARK OFFICE
CERTIFICATE OF CORRECTION

PATENT NO. : 7,620,571 B2  Page 1 of 1
APPLICATION NO. : 10/835063
DATED : November 17, 2009
INVENTOR(S) : Gieselmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Twenty-sixth Day of October, 2010

David J. Kappos
*Director of the United States Patent and Trademark Office*